US005579662A

United States Patent [19]

Reasoner

[11] Patent Number: 5,579,662
[45] Date of Patent: Dec. 3, 1996

[54] LOW FORCE SLIDE-N-SNAP HIGH FORCE RETENTION

[75] Inventor: Michael Reasoner, Ortonville, Mich.

[73] Assignee: Teleflex Incorporated, Plymouth Meeting, Pa.

[21] Appl. No.: 520,713

[22] Filed: Aug. 29, 1995

[51] Int. Cl.$^6$ .................................................. F16C 1/10
[52] U.S. Cl. ........................................ 74/502.4; 74/502.6
[58] Field of Search ............................. 74/500.5, 501.5 R, 74/502.4, 502.6; 403/256, 257, 319, 326, 329

[56] References Cited

U.S. PATENT DOCUMENTS

| | | | |
|---|---|---|---|
| 3,544,951 | 12/1970 | Roberts | 403/329 |
| 3,885,767 | 5/1975 | Olowinski et al. | 248/204 |
| 4,763,541 | 8/1988 | Spease | 74/500.5 |
| 4,951,524 | 8/1990 | Niskanen | 74/502.4 |
| 5,104,253 | 4/1992 | Zielinski et al. | 403/329 |
| 5,272,934 | 12/1993 | Chegash et al. | 74/502.4 |
| 5,280,733 | 1/1994 | Reasoner | 74/502.6 |
| 5,461,938 | 10/1995 | Froling et al. | 74/502.4 |

Primary Examiner—Charles A. Marmor
Assistant Examiner—Chong H. Kim
Attorney, Agent, or Firm—Howard & Howard

[57] ABSTRACT

A slide-n-snap in support fitting 14 for motion transmitting remote control assembly of the type for transmitting motion by a flexible motion transmitting core element 12. The fitting 14 presents a pair of spaced inner 24 and outer 26 flanges for receiving therebetween the edge of a slot 18 in the support structure 16 and a pair of locking arms 22 extend in a cantilevered fashion a direction transverse to the guideways 20 defined by the flanges 24 and 26 for flexing about an axis parallel to the guideways 20 and remaining inflexible in the direction parallel to the guideways 20 for extending over the support structure 16 adjacent the slot 18 therein while flexing about the axis parallel to the guideways 20 during insertion of the fitting 14 into the slot 18 and snapping back into mechanical interlocking engagement with the end of a ramp 32 projecting from the support structure 16 in the locked position so that forces urging the fitting 14 out of the locked position in the slot 18 will react with the arms 22 in the inflexible direction, thereby providing relatively low force to insert the fitting 14 into the slot 18 while providing a relatively high retention force to prevent the fitting 14 from being removed from the slot 18.

7 Claims, 2 Drawing Sheets

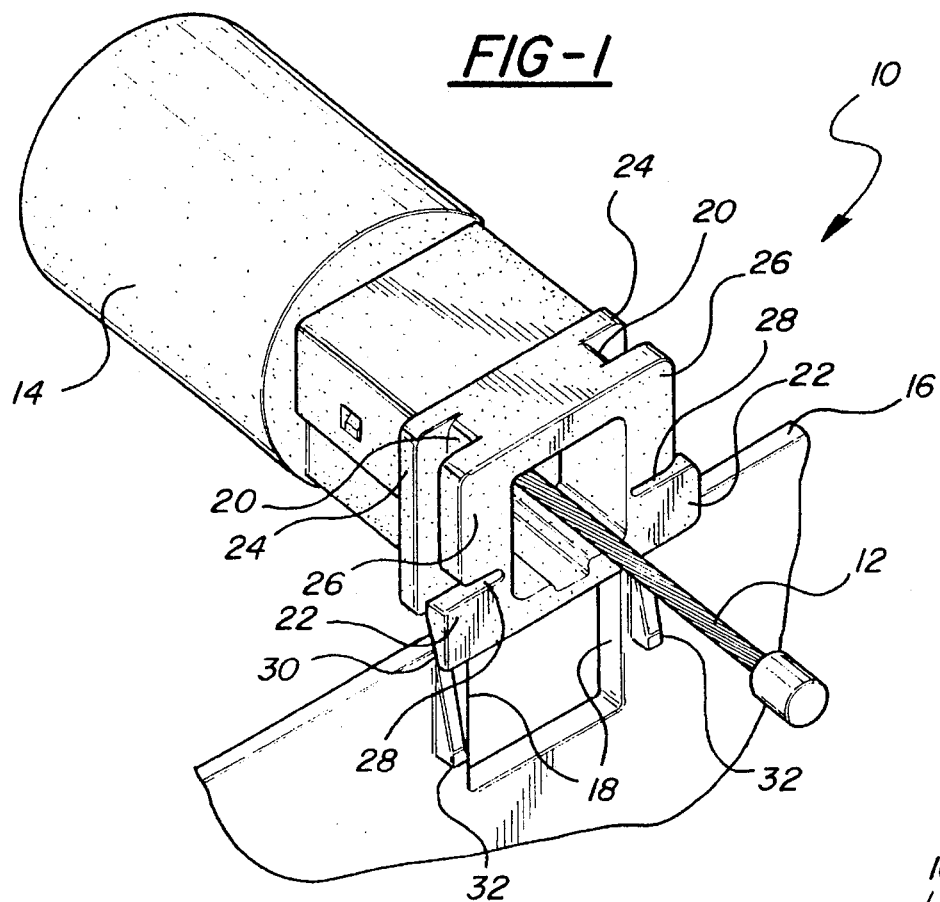
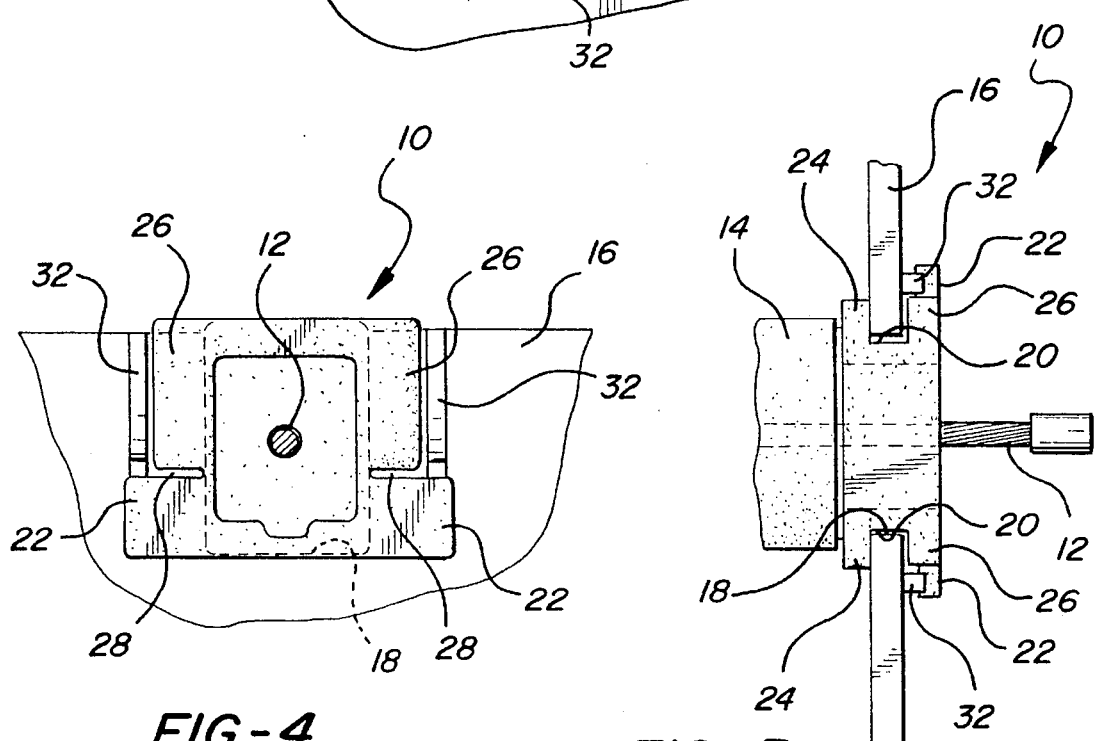

LOW FORCE SLIDE-N-SNAP HIGH FORCE RETENTION

TECHNICAL FIELD

The subject invention relates to a motion transmitting remote control assembly of the type for transmitting forces in a curved path by a flexible motion transmitting core element. More specifically, the invention relates to an improved fitting for mounting or attaching such an assembly in a slot in support structure such as bulkhead or bracket.

BACKGROUND ART

Such remote control assemblies are frequently supported in U-shaped slot in a bulkhead, bracket, or the like. A fitting is attached to a conduit which, in turn, movably supports a core element and the fitting includes a pair of spaced flanges for slidably engaging the edges of the U-shaped slot. In order to retain the fitting in the U-shaped slot, such fittings have included an L-shaped arm with a projection on the distal end for dropping into a hole spaced from the slot. The arm flexes during installation as the projection slides over the surface next to the U-shaped slot. The force required to inadvertantly remove the fitting from the U-shaped slot is the force necessary to flex the arm; however, that force is limited by the force required to initially insert the fitting into the U-shaped slot. Such assemblies are disclosed in U.S. Pat. Nos. 3,885,767 to Olowinski et al; 4,763,541 to Spease and 4,951,524 to Niskanen.

SUMMARY OF THE INVENTION

A motion transmitting remote control assembly of the type for transmitting forces in a curved path by a flexible core element movably supported in a conduit means which includes a support fitting for attachment to a support structure by sliding into a locked position in a slot in the support structure. The fitting includes a body and at least one guideway for sliding engagement with the slot in the support structure. The assembly is characterized by a locking arm extending in a cantilevered fashion from the body in a direction transverse to the guideway for flexing about an axis parallel to the guideway and remaining inflexible in the direction parallel to the guideway for extending over the support structure adjacent the slot therein while flexing about the axis parallel to the guideway during insertion of the fitting into the slot and snapping back into mechanical interlocking engagement with the support structure in the locked position so that forces urging the fitting out of the locked position in the slot react with the arm in the inflexible direction.

In accordance with the subject invention, therefore, the force required to insert the fitting into the U-shaped slot may be maintained relatively low while attaining a much higher force to retain the fitting in mechanically interlocking engagement with the support structure.

Other advantages of the present invention will become readily appreciated as the same becomes better understood by reference to the following detailed description when considered in connection with the accompanying drawings wherein:

FIG. 1 is perspective view of a preferred embodiment of the subject invention;

FIG. 2 a fragmentary side elevational view showing the assembly initially entering the U-shaped slot;

FIG. 4 is an end view taken substantially along line 4—4 of FIG. 3; and

FIG. 5 is a top view taken substantially along line 5—5 of FIG. 4.

DETAILED DESCRIPTION OF PREFERRED EMBODIMENT

Figure 2:
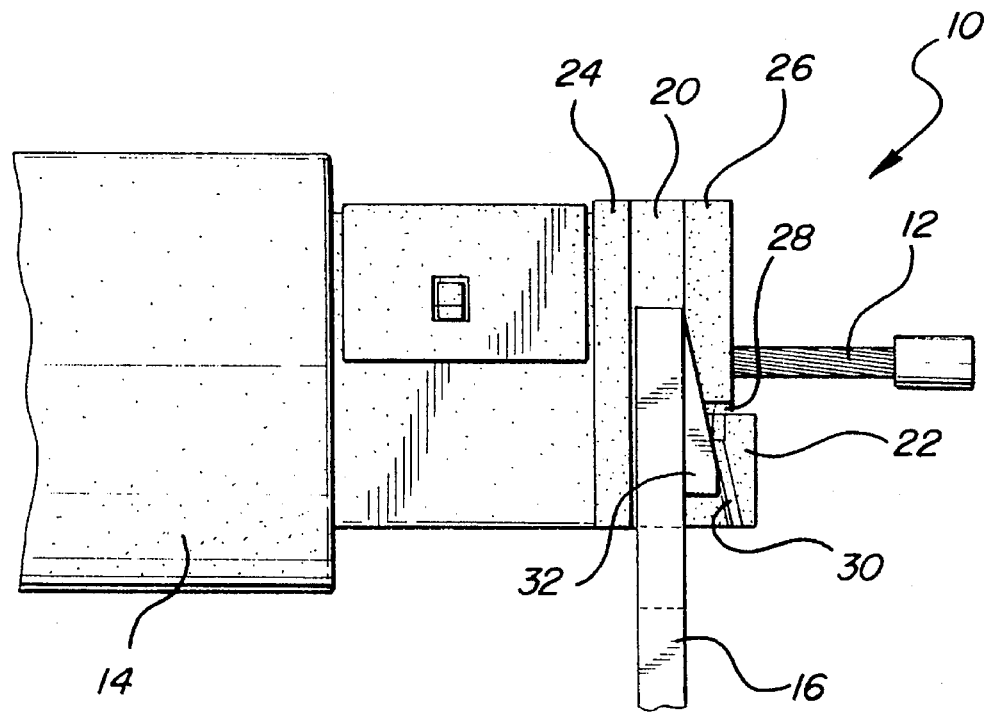
Figure 3:
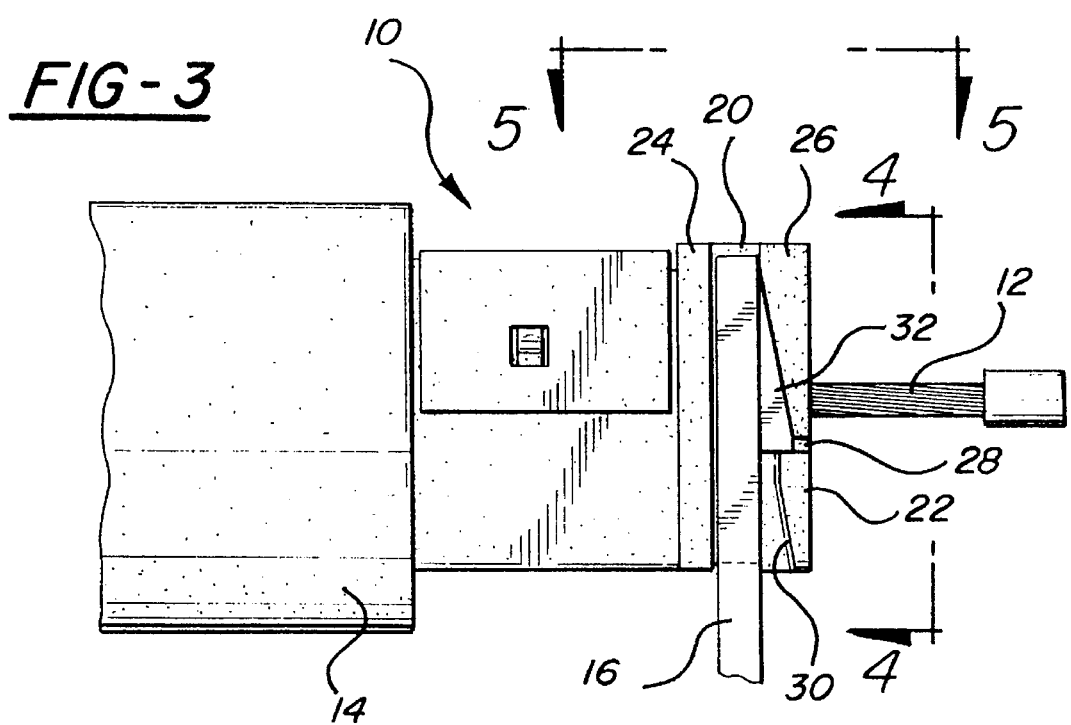
FIG. 3 is a view like FIG. 2 but showing the assembly in the fully inserted and mechanically locked position.

A motion transmitting remote control assembly of the type for transmitting forces in a curved path and constructed in accordance with the subject invention is generally shown at 10.

The assembly 10 comprises conduit means for movably supporting a motion transmitting core element 12. As is well known in the art, the conduit means includes a tubular conduit (not shown) attached to an end fitting or ferrule 14. The conduit comprises an inner tubular member surrounded by a plurality of long lay wires spiraled along the inner tubular member with a casing extruded about the long lay wires.

The flexible motion transmitting core element 12 is either a wire or stranded as shown and extends from both ends of the conduit means as it is movably supported by the conduit means.

The end or support fitting 14 is made of a hard plastic material and is adapted for attachment to a support structure, such as the bulkhead or bracket 16, by sliding into a locked position in a slot 18 in the support structure 16. The fitting 14 includes a body and a pair of guideways 20 for sliding engagement with the slot 18 in the support structure 16.

The assembly is characterized by a pair of locking arms 22 extending in a cantilevered fashion from the body in a direction transverse to the guideways 20 for flexing about an axis parallel to the guideways 20 and remaining inflexible in the direction parallel to the guideways 20 for extending over the support structure 16 adjacent the slot 18 therein while flexing about the axis parallel to the guideways during insertion of the fitting 14 into the slot 18 and snapping back into mechanical interlocking engagement with the support structure 16 in the locked position so that forces urging the fitting 14 out of the locked position in the slot 18 react with the arms 22 in the inflexible direction.

Each guideway 20 is defined by a pair of spaced inner 24 and outer 26 flanges for receiving therebetween the edge or periphery of the slot 18 in the support structure 16. Each arm 22 is co-planer with the adjacent outer flange 26 and is separated therefrom by a slit 28. Each arm 22 also includes ramp means or inclined surface 30 for facilitating flexing movement of the arm 22 up and over the support structure 16 during insertion of the fitting 14 into the slot 18. More specifically, the inclined surface 30 is disposed on the inside of each arm 22 as the arm 22 decreases in thickness in the direction of the adjacent guideway 20 and away from the slit 28 adjacent the inner flange 24 for ramping up and over a projection defined by a ramp 32 on the support structure 16 and snapping back to place the thick edge of the arm 22 adjacent the slit 28 in the mechanical interlocking engagement with the end of the ramp 32 defining the projection of the support structure 16. The ramps 32 on the bulkhead 16 are disposed laterally beside the outer extremities of the outer flanges 26 and each arm 22 extends farther laterally from the body than the outer flange 26 so that the thick edge of the arm snaps over and engages the end of the ramp 32.

Accordingly the fitting 14 includes a pair of the inner 24 and outer 26 flanges and one of the arms 22 extending from opposite sides of the fitting 14 body to engage the opposite edges of the slot 18 in the bulkhead defining the support structure 16.

As the fitting 14 is mounted on the support structure, the edges of the slot 18 are disposed in and saddled between the inner 24 and outer 26 flanges and the inclined surface 30 of each arm 22 rides up the projection ramp 32. In so moving, the arms are forced to flex outwardly, but with a minimum force to keep the insertion force low. The arms flex about their respective connections to the body of the fitting 14, i.e., about an axis which is parallel to the guideways 20 which define the direction of insertion into the slot 18. Once the fitting is fully inserted into the slot 18, the thick edge of each arm 22 snaps over the high end of the projection ramps and back to its unstressed condition in mechanical interlocking engagement with the end s of the ramps 32 of the support structure. Consequently, a very high retention force is attained because any removal force acts against the thick ends of the arms 22 and the arms present very high moments in the direction parallel to the axis of connection of the arms 22 to the body of the fitting 14. Said another way, the arms 22 are rectangular as viewed in cross section and the arms flex about an axis parallel to the long dimension and are rigid about an axis parallel to the short dimension.

The invention has been described in an illustrative manner, and it is to be understood that the terminology which has been used is intended to be in the nature of words of description rather than of limitation. Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed:

1. A motion transmitting remote control assembly of the type for transmitting forces in a curved path by a flexible core element, said assembly comprising:

conduit means for movably supporting a motion transmitting core element;

a flexible motion transmitting core element movably supported by said conduit means;

said conduit means including a support fitting for attachment to a support structure by sliding into a locked position in a slot in the support structure;

said fitting including a body and at least one guideway for sliding engagement with the slot in the support structure;

said assembly characterized by a locking arm extending in a cantilevered fashion straight from said body solely in a direction transverse to said guideway for flexing only about an axis parallel to said guideway and remaining inflexible in the direction parallel to said guideway, said arm including ramp means for facilitating flexing movement of said arm up and over the support structure adjacent the slot therein while flexing about the axis parallel to said guideway during insertion of said fitting into the slot, said ramp means being defined by an inclined surface on the inside of said arm as said arm decreases in thickness in the direction of said guideway for ramping up and over a projection on the support structure and snapping back to place the thick edge of said arm in mechanical interlocking engagement with the projection of the support structure in the locked position so that forces urging said fitting out of the locked position in the slot react with said arm in the inflexible direction.

2. An assembly as set forth in claim 1 wherein said guideway is defined by a pair of spaced inner and outer flanges for receiving therebetween the edge of the slot in the support structure.

3. An assembly as set forth in claim 2 wherein said arm is co-planer with said outer flange and separated therefrom by a slit.

4. An assembly as set forth in claim 3 wherein said arm extends farther from said body than said outer flange.

5. An assembly as set forth in claim 4 wherein said arm decreases in thickness in the direction of said guideway and away from said slit.

6. An assembly as set forth in claim 5 wherin said fitting includes a pair of said flanges and one of said arms extending from opposite sides of said body to engage the opposite edges of the slot in the support structure.

7. An assembly as set forth in claim 6 wherein said conduit means includes a flexible conduit extending from said fitting, said fitting being of a hard plastic material.

* * * * *